Patented Nov. 9, 1926.

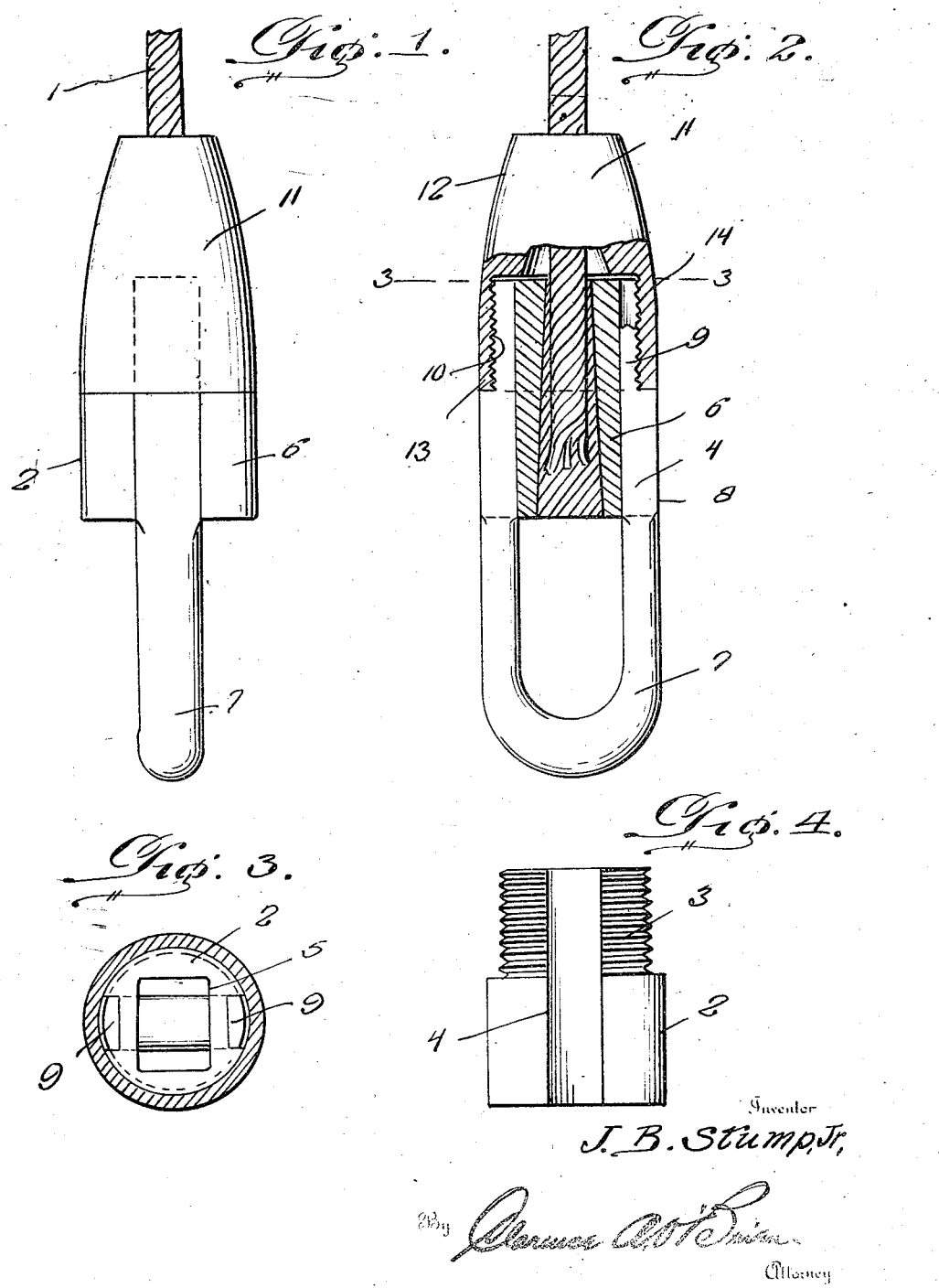

1,606,272

UNITED STATES PATENT OFFICE.

JIM BRUCE STUMP, JR., OF EL DORADO, ARKANSAS.

WIRE-LINE COUPLING.

Application filed October 31, 1925. Serial No. 66,003.

My present invention has to do with the connection of wire lines to bailers, sand pumps and the like; and it has for its object the provision of a device in the form of a wire line attachment, for effecting connection between the line and a bailer or any other device, the connection being of such character that by quick manipulation of the coupling one bailer or the like may be separated from the wire line and another bailer or any other device equipped with a bail may be expeditiously and easily attached to the line, and this by one operative.

With the foregoing in mind, the invention in all of its details will be fully understood from the following description and claims when the same are read in connection with the drawings, accompanying and forming part of this specification, in which:—

Figure 1 is an elevation showing my novel coupling as applied to a wire line; the construction being the best construction of which I am cognizant.

Figure 2 is a view at right angles to Figure 1, and partly in elevation and partly in section.

Figure 3 is a cross section taken in the plane indicated by the line 3—3 of Figure 2.

Figure 4 is an elevation of the intermediate member of the coupling, showing one of the longitudinal grooves in said member.

Similar numerals of reference designate corresponding parts in all of the views of the drawings.

I show at 1 in Figures 1 and 2 a wire line, and to said line is permanently connected the intermediate member 2 of my improvement. The said intermediate member 2 is provided with a reduced and exteriorly threaded upper portion 3, and at diametrically opposite points in the member 2 are longitudinal grooves 4 which extend through the length of the member. As appears in Figure 2 the said grooves 4 are formed in the threaded part of the member 1 as well as in the unthreaded part thereof.

By comparison of Figures 2 and 3, it will be understood that the body 11 is provided with a bore 5 of rectangular cross-section, and it will also be understood that the said bore 5 is tapered upwardly—i. e., the bore is larger at its lower end than at its upper end.

The wire line 1 is extended downwardly into the bore 5 of the member 11 and the said line is rabbeted in the bore 5 or is otherwise secured to the member 1 so as to carry a considerable load without liability of the member 1 being detached from the wire line. The rabbeting is designated in Figure 2 by 6.

In addition to the intermediate or body member 1, the coupling comprises a loop member, designed to receive in its bight any device having a bail, such for instance as a bailer, sand pump or the like. The loop member 7 has side portions or arms 8 designed to enter and rest in the grooves 4 of the intermediate or body member 2, and the upper portions of the said arms 8 are reduced, as designated by 9, and are threaded, as designated by 10, the threads being designed when the parts are relatively arranged as shown in Figure 2, to coincide with the thread on the upper reduced portion of the intermediate member or body 2.

The third or crown member of my novel coupling is designated by 11. It receives and is turnable about and movable rectilinearly on the line 1, and in addition to the bore 12, is provided with a skirt 13, interiorly threaded at 14 to engage the threads 3 of the intermediate or body member 2, and the coincident thread on the arms of the loop member 7.

In the practical use of my novel coupling it will be understood that when the crown member 11 is turned and moved upwardly out of engagement with the threaded portions of the loop member 7 and also, by preference, out of engagement with the threaded portion of the intermediate or body member 2, the loop member 7 may be readily removed from the body member 2 and the line 1. From this it follows that one operative is enabled to expeditiously and easily change the line 1 from one bailer to another or to a sand pump or the like, the loop member 7 being adapted to be readily engaged with the bail of a bailer or sand pump and being also adapted to be as readily moved rectilinearly into engagement with the body 2 and coupled by the crown member 11 to the line 1.

Notwithstanding the practical advantages of my novel coupling as set forth, the coupling is manifestly simple and inexpensive in construction and at the same time is compact and therefore adapted to be used in spaces of small compass.

While I have specifically described the construction and relative arrangement of the parts embraced in the present and preferred embodiment of my invention of which I am aware, I do not desire to be understood as confining myself to the specific construction and arrangement disclosed, my invention being defined by my appended claims within the scope of which changes in form and arrangement may be made without departure from my invention.

Having described my invention, what I claim and desire to secure by Letters-Patent, is:—

1. A coupling comprising an intermediate member with a tapered bore of angular cross-section adapted to receive and be secured to a wire line or the like, said intermediate member having exterior longitudinal grooves at diametrically opposite points and also having a reduced and exteriorly threaded end portion, a loop member having side portions or arms removably arranged in said grooves and reduced at their ends and havings threads on the reduced portions adapted to coincide or register with the thread of the intermediate member, and a member having a bore for the passage of a wire line or the like and movable about and rectilinearly of said line and having an interiorly threaded skirt portion for engagement with the threaded portions of the intermediate member and loop member.

2. A coupling comprising an intermediate member with a tapered bore of angular cross-section adapted to receive and be secured to a wire line or the like, said intermediate member having exterior longitudinal grooves at diametrically opposite points and also having a reduced and exteriorly threaded end portion, a loop member having side portions or arms removably arranged in said grooves and reduced at their ends and having threads on the reduced portions adapted to coincide or register with the thread of the intermediate member, and a member having a bore for the passage of a wire line or the like and movable about and rectilinearly of said line and having an interiorly threaded skirt portion for engagement with the threaded portions of the intermediate member and loop member, in combination with the said wire line extending loosely through the third-named member of the coupling and secured in the said taper bore of the intermediate member.

3. In a coupling, an intermediate member adapted to be attached to a wire line or the like and exteriorly grooved and having an exteriorly grooved reduced end portion, a loop member having side portions or arms removably arranged in the grooves of the intermediate member and also having the end portions of said arms reduced and threaded, the threads adapted to coincide with those of the intermediate member, and threaded means adapted to be moved on the wire line and detachably connecting the arms of the loop member to the intermediate member.

In testimony whereof I affix my signature.

JIM BRUCE STUMP, Jr.